United States Patent
Walker et al.

(10) Patent No.: US 6,777,088 B2
(45) Date of Patent: Aug. 17, 2004

(54) PACKAGING MATERIALS HAVING BARRIER COATINGS BASED ON WATER-EPOXY RESIN COPOLYMERS

(75) Inventors: Frederick Herbert Walker, Allentown, PA (US); Frank Ralph Pepe, Quakertown, PA (US); John Bartram Dickenson, North Wales, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 164 days.

(21) Appl. No.: 10/114,085

(22) Filed: Apr. 1, 2002

(65) Prior Publication Data

US 2003/0198815 A1 Oct. 23, 2003

(51) Int. Cl.$^7$ ............... B32B 27/28; B32B 27/32; B32B 27/36
(52) U.S. Cl. ............... 428/412; 428/480; 428/523
(58) Field of Search ............... 428/411.11, 413, 428/412, 480, 523, 304.4, 318.4, 318.6

(56) References Cited

U.S. PATENT DOCUMENTS

| | | |
|---|---|---|
| 4,145,324 A | 3/1979 | Chen |
| 5,008,137 A | 4/1991 | Nugent, Jr. et al. ............ 428/35 |
| 5,275,853 A | 1/1994 | Silvis et al. ............... 428/35.4 |
| 5,300,541 A | 4/1994 | Nugent, Jr. et al. ......... 523/414 |
| 5,464,924 A | 11/1995 | Silvis et al. ............... 528/102 |
| 5,637,365 A | 6/1997 | Carlblom ................... 428/354 |
| 5,728,439 A | 3/1998 | Carlblom ................. 428/36.91 |
| 5,802,643 A | 9/1998 | Sloot ........................... 427/341 |
| 5,840,825 A | 11/1998 | Carlblom et al. .......... 528/18.3 |
| 5,962,093 A | 10/1999 | White et al. ............... 428/35.2 |
| 6,346,596 B1 | 2/2002 | Mallen et al. .............. 528/176 |
| 2003/0032738 A1 * | 2/2003 | Walker et al. .............. 525/528 |

FOREIGN PATENT DOCUMENTS

| | | |
|---|---|---|
| EP | 1 142 924 A1 | 10/2001 |
| EP | 1 262 505 A1 | 12/2002 |
| GB | 2 125 405 A | 3/1984 |
| WO | WO 01/60701 A2 | 8/2001 |

OTHER PUBLICATIONS

Z. W. Wicks, et al., "Organic Coatings Science and Technology," $2^{nd}$ Ed., Wiley–Interscience: New York, 1999, pp. 162–179.

European Search Report 03007273.0–2124 dated Jun. 30, 2003.

* cited by examiner

Primary Examiner—Robert Dawson
Assistant Examiner—Michael J. Feely
(74) Attorney, Agent, or Firm—Michael Leach

(57) ABSTRACT

A multilayer packaging material comprising
(a) at least one layer of a gas-permeable material, and
(b) at least one layer of a gas-barrier coating comprising a polymeric polyol made by copolymerizing a multi-functional epoxide resin and water in the presence of an amount of acid effective for polymerizing the epoxide resin and the water, the amount of water being sufficient to avoid gelation, the polymeric polyol optionally reacted with a crosslinking agent for hydroxyl functionality, especially an amino resin.

32 Claims, No Drawings

PACKAGING MATERIALS HAVING BARRIER COATINGS BASED ON WATER-EPOXY RESIN COPOLYMERS

FIELD OF THE INVENTION

The present invention relates to barrier materials, curable coating compositions for forming such materials, and to packaging materials and/or containers including barrier materials.

BACKGROUND OF THE INVENTION

Plastics have found increasing use as replacements for glass and metal containers in packaging, especially of foods and beverages. The advantages of such plastic packaging includes lighter weight, decreased breakage (versus glass), resealability (versus most metal containers), and potentially lower costs. However, shortcomings in the gas-barrier properties of common packaging plastics, such as polyolefins, poly(ethylene terephthalate) (PET), and polycarbonates, present major disadvantages in the packaging of many foods and beverages.

Gases such as oxygen and carbon dioxide can readily permeate through most of the plastic materials commonly used by the packaging industry. Oxygen destroys the vitamin C present in fruit juices, and adversely effects the flavor of fruit juices and beer. Loss of carbon dioxide from carbonated beverages and beer results in the products going flat. Thus, the shelf life of beverages and foods in plastic containers is often much shorter than the shelf life of such products in traditional glass and metal containers. The problem is particularly acute in small packages designed for individual servings, since the greater surface-to-volume ratio of the smaller packages results in even shorter shelf life.

U.S. Pat. Nos. 5,008,137; 5,300,541; 5,637,365; 5,728,439; 5,840,825; and 5,902,643 all relate to gas barrier coatings formed by reacting polyepoxides and polyamines. U.S. Pat. No. 5,008,137 (Col 10/11–21) states "the thermoset barrier material will contain at least about four percent by weight amine nitrogen, preferably at least about seven percent by weight amine nitrogen and more preferably at least about nine percent by weight amine nitrogen. While not wishing to be bound by the present explanation, it is believed that greater levels of amine nitrogen in the barrier material contributes to lower gas permeabilities." U.S. Pat. No. 5,300,541 at Col 2/6–13 states at least about seven percent by weight amine nitrogen is required, while exceptionally good barrier properties were found to be obtained at amine nitrogen contents of at least ten percent. The expression "amine nitrogen" is intended to exclude other nitrogen containing groups such as amides and urethanes. U.S. Pat. No. 5,637,365 discloses coatings where "the amine nitrogen content of these cured coatings may be less than seven percent, with good results being attainable a (sic) low as four percent or lower. The relatively lower amine content of the present invention generally has the advantage of less yellowing of the coating over time.") (Col 2/27–33.)

U.S. Pat. Nos. 5,275,853; 5,464,924; and 5,962,093 are all related to thermoplastic barrier materials based on the chain extension of diglycidyl ethers with a monofunctional primary amine or a bis(secondary) diamine.

U.S. Pat. No. 6,346,596 B1 discloses a gas barrier polymer composition with active hydrogen functionality wherein the polymer is prepared by reacting a solution of organic diacid containing at least one active hydrogen group and diglycidyl ether in the presence of an optional catalyst.

U.S. application Ser. No. 10/062924 filed Jan. 31, 2002 discloses the acid catalyzed copolymerization of multifunctional epoxide compounds and water, preferably in the presence of a solvent, to produce higher molecular weight polyol products. Such polyols may be crosslinked with OH-reactive crosslinking agents, including amino resins such as melamine-formaldehyde resins, to yield crosslinked films exhibiting excellent properties such as high hardness and solvent resistance at relatively low bake temperatures.

SUMMARY OF THE INVENTION

The present invention provides a method for making a multilayer packaging material which reduces transmission of oxygen comprising (a) providing a gas-permeable packaging material, (b) providing a gas-barrier coating comprising a polymeric polyol made by copolymerizing a multifunctional epoxide resin and water in the presence of an amount of acid effective for polymerizing the epoxide resin and the water, the amount of water being sufficient to avoid gelation, and, optionally, a crosslinking agent for hydroxyl functionality, preferably an amino resin, (c) applying the gas barrier coating over the gas-permeable packaging material to form a multilayer packaging material, and (d) optionally heating the coated packaging material to effect crosslinking.

As another embodiment of the invention there is provided a multilayer packaging material comprising (a) at least one layer of a gas-permeable material, preferably a polymeric plastic material, and (b) at least one layer of a gas-barrier coating comprising a polymeric polyol made by copolymerizing a multifunctional epoxide resin and water in the presence of an amount of acid effective for polymerizing the epoxide resin and the water, the amount of water being sufficient to avoid gelation, the polymeric polyol optionally reacted with a crosslinking agent for hydroxyl functionality, preferably an amino resin. Preferably the gas-barrier coating affords an oxygen permeability constant of less than 2 Dow units when measured at 25° C. and 0% relative humidity.

Yet another and preferred embodiment of the invention affords a multilayer packaging material having at least one gas-permeable packaging material layer and at least one gas barrier material layer characterized in that the gas barrier material layer comprises the reaction product of (a) a polymeric polyol made by copolymerizing the diglycidyl ether of bisphenol-A, the diglycidyl ether of bisphenol-F, the diglycidyl ether of hydroquinone, the diglycidyl ether of resorcinol or a mixture thereof and water in the presence of an ether solvent and an amount of superacid effective for polymerizing the diglycidyl ether and the water, the amount of water being sufficient to avoid gelation, and (b) a crosslinking agent for hydroxyl functionality, preferably an amino resin crosslinking agent which is a melamine-formaldehyde resin, a urea-formaldehyde resin, a benzoguanamine-formaldehyde resin, a glycouril-formaldehyde resin, or an etherified derivative thereof.

Multifunctional epoxide resin-water copolymer compositions used in the barrier compositions comprise higher molecular weight polyols, or polymeric polyols, having a number average molecular weight (Mn) of at least about two times the molecular weight of the multifunctional epoxy resin from which they are prepared as measured by GPC using polystyrene calibration standards. The polymeric polyols will comprise glycol end groups and a repeat unit structure which contains two glycidyl units, primary and/or secondary alcohols.

When preferably formulated with suitable amino resin crosslinking agents, such as melamine formaldehyde resins, the polymeric polyols of Mn 500 to 5000, preferably 1000 to 3000, afford a composition which as a cured film or coating on a plastic packaging material substrate provide gas-barrier packaging materials.

The barriers substantially reduce the permeability of gases such as carbon dioxide and/or oxygen through polymeric packaging materials. The oxygen permeability constant (OPC) of the cured barrier composition itself will be less than 2 Dow units, preferably less than 1 and most desirably less than 0.3 Dow units.

DETAILED DESCRIPTION OF THE INVENTION

The oxygen permeability constant (OPC) of a material quantifies the amount of oxygen which can pass through a film or coating under a specific set of circumstances. It is often expressed in units of cubic centimeter-mil/100 square inches/atmosphere/day, a unit of measure referred to in the industry as Dow units. This is a standard unit of permeation measured as cubic centimeters of oxygen permeating through 1 mil (25.4 micron) thickness of a sample, 100 square inches (645 square centimeters) in area, over a 24 hour period, under a partial pressure differential of one atmosphere at specific temperature and relative humidity (R.H.) conditions. As used herein, OPC values are reported at 25° C. and 0% R.H., unless otherwise stated.

For purposes of this invention, the terms "polymeric polyol" and "epoxide resin-water copolymer" are used interchangeably.

The method for making the polymeric polyols used in the gas-barrier layer compositions, or coatings, is described in U.S. application Ser. No. 10/062924 filed Jan. 31, 2002, which is hereby incorporated by reference. Essentially, the method comprises copolymerizing a multifunctional epoxide resin and sufficient water to prevent gelation of the polymerizing epoxide resin, in the presence of an acid substance and optionally, but preferably, in the presence of a solvent that provides a polymerization medium that dissolves the reactants, i.e., affords solution polymerization.

The multifunctional epoxide compounds, or resins, useful in making the polymeric polyols, or epoxide resin-water copolymers, comprise those compounds containing an average of more than one 1,2-oxirane groups per molecule, and which do not contain basic functional groups that destroy the catalytic activity of the acid catalysts, thus preventing the desired copolymerization. The preferred polyepoxy compounds for the present invention are the diglycidyl ether of bisphenol-A (BADGE), the diglycidyl ether of bisphenol-F (BFDGE), the diglycidyl ether of hydroquinone, and the diglycidyl ether of resorcinol (RDGE). The most preferred polyepoxy compound is the diglycidyl ether of resorcinol (RDGE).

As the average functionality of the multifunctional epoxy resin is increased, it will be recognized by those skilled in the art that a larger ratio of water per equivalent (eq) of epoxide resin will be required to prevent gelation, as predicted by well-known theories of gelation.

The minimum amount of water for the polymerization will be that amount sufficient to avoid gelation of the polymer product, desirably about 2.5–10 g water/eq epoxide resin. The upper limit for the amount of water is determined by the molecular weight of the polymeric polyol desired. With any given multifunctional epoxide compound, the more water used as a reactant the lower the molecular weight of the polymeric polyol product. In the case of RDGE polymerized in 1,4-dioxane, the minimum amount of water is about 11 wt % based on the amount of RDGE. Use of additional water decreases the molecular weight of the copolymer, and the amount of water can be as high as about 25 wt %.

In order to copolymerize the multifunctional epoxide compound and water, an acid catalyst with the ability to yield the desired technical effect is required. Not all acid substances are suitable. Certain Brønsted acids and certain Lewis acids have been found to be effective catalysts for the copolymerization.

The amount of acid material used is that amount sufficient to catalyze the polymerization reaction of the epoxy resin and water within the temperature and time limits desired. Such catalytic amount will depend on the acid material, the solvent and the epoxy resin used, but in general may range from 0.001 to 1 eq acid catalyst per liter, preferably 0.01 to 0.5 eq/L.

Superacids are a particularly useful class of acid for the purposes of this invention. Particularly useful superacids for the copolymerization of water and diglycidyl ethers of dihydric phenols include perchloric, trifluoromethanesulfonic, perfluoroalkyl-sulfonic, tetrafluoroboric, and hexafluorophosphoric acids and boron trifluoride.

Based on a combination of 13C NMR and matrix assisted laser desorption/-ionization (MALD/I) mass spectrometry, the polymeric polyol derived from this process is believed to have the following structure:

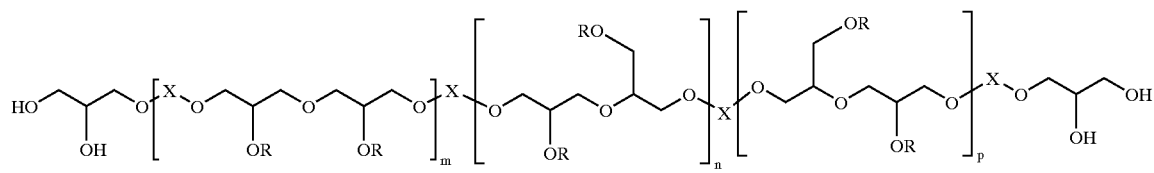

where X is the organic linking group from a diglycidyl ether, R is hydrogen or either of the following radicals 1 or 2:

As an example, when the diglycidyl ether of resorcinol is the starting material, the polymeric polyol has the following structure:

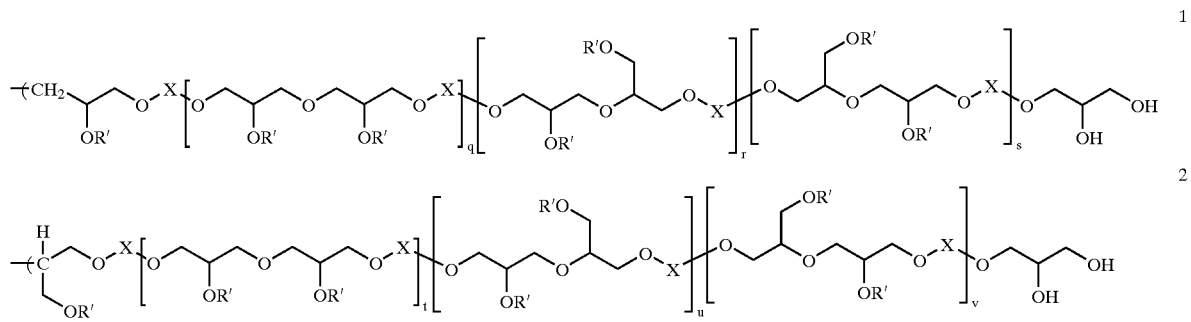

where R'=R or H and where m, n, p, q, r, s, t, u and v range from 0 up to about 50, with the proviso that (m+n+p)≧1. The m, n and p, the q, r and s and the t, u and v units appear

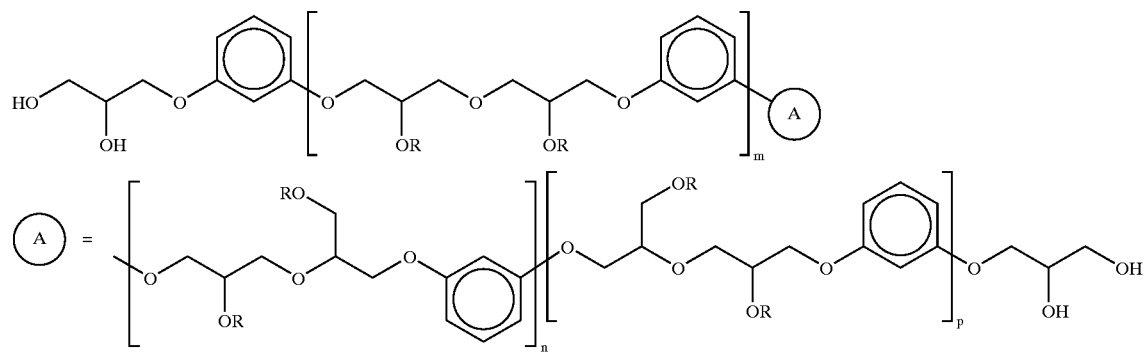

in random order. Preferred organic linking groups for X include:

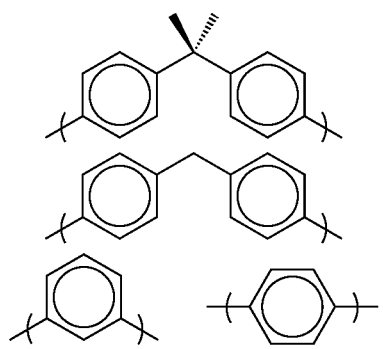

where R=hydrogen or either of the following radicals 1 or 2:

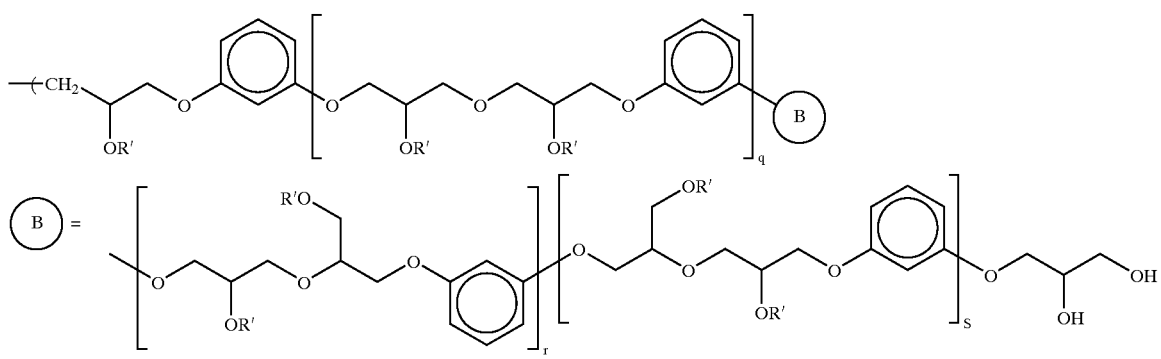

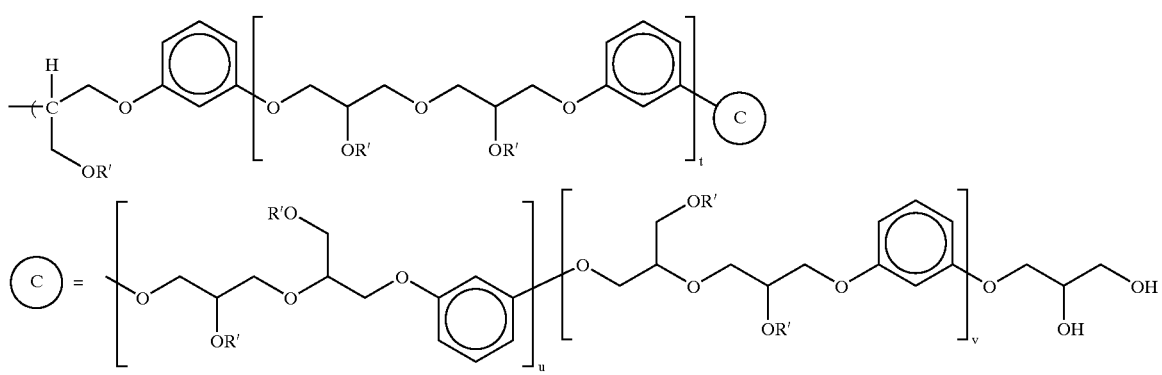

where R'=R or H and where m, n, p, q, r, s, t, u and v range from 0 up to about 50, with the proviso that (m=n=p)≧1. The m, n and p, the q, r and s and the t, u and v units appear in random order. Thus, in contrast to traditional resorcinol epoxy resins the repeat unit structure contains two glycidyl units, primary and/or secondary alcohols, as well as the corresponding branching units derived from these alcohols, and all or nearly all of the epoxide end groups have been hydrolyzed to glycol end groups. When R=H, the repeat unit structure contains two glycidyl units and primary and/or secondary alcohols. In the structures shown, repeat units are not included where both hydroxyls or their corresponding branch points are primary, since these units were not detected in the NMR spectrum. However, they probably exist in the reaction mixture, though in quantities below the detection limit of NMR.

The molecular weight of the polyol product of the copolymerization is dependent on the amount of water employed relative to the amount of multifunctional epoxide. Useful number average molecular weights (Mn), as measured by GPC vs. polystyrene standards, are at least about twice the Mn of the multifunctional epoxy resin from which it is prepared, (for diglycidyl ether of resorcinol at least about 450), preferably at least about four times the Mn, and may range as high as about eight times or more, with the maximum Mn being that which can be achieved without gelling the reaction medium. Below a certain critical, minimum amount of water the product of the reaction is a gel, and hence the molecular weight is undefined. Using commercial diglycidyl ether of resorcinol with an equivalent weight of 115–120, it was found that this minimum amount of water was dependent on the specific catalyst employed, the amount of that catalyst, the nature of the solvent for the reaction, and the temperature, but is about 11 g of water per 100 g of diglycidyl ether of resorcinol at temperatures from about 25° C. to 90° C. In any event, it is relatively straightforward for one skilled in the art to determine the critical amount of water by conducting small-scale reactions using progressively smaller amounts of water relative to epoxy resin until a gelled product is obtained.

Suitable solvents employed in this copolymerization are those solvents that substantially dissolve both the multifunctional epoxide compound and the water so that an essentially homogenous reaction mixture is obtained. Preferred solvents include ethers and specific examples are the water miscible ethers, such as 1,4-dioxane, 1,2-dimethoxyethane, diglyme, triglyme, and the like.

When using the preferred solvents of the invention, depending on the specific catalyst employed, the reaction temperature and the concentration of the reactants, it is possible for some of the solvent molecules or portions of the solvent molecules to become incorporated into the copolymer structure. For example, hydroxyl groups on the copolymer may be etherified by reaction with 1,4-dioxane as shown below.

$$R\text{—}OH + \underset{}{\bigcirc} \xrightarrow{H^+} R\text{—}O\text{—}\text{—}O\text{—}\text{—}OH$$

The resulting hydroxyl group can also participate in additional reactions with epoxide functional groups, as will be clear to one skilled in the art.

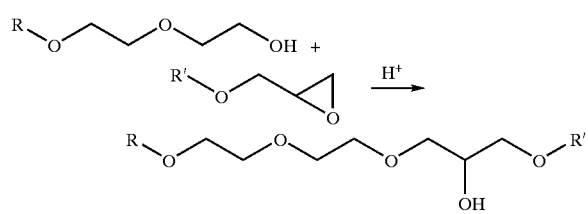

Likewise, when employing 1,2-dimethoxyethane as a solvent, the etherification reactions shown below may occur. The monofunctional alcohol that is a side product of this reaction may also react with epoxide functional groups. This may chain-stop the polymerization and thereby reduce the minimum amount of water that must be employed in the process so as to avoid gelation. Reactions possible with other ether solvents will be obvious to one skilled in the art.

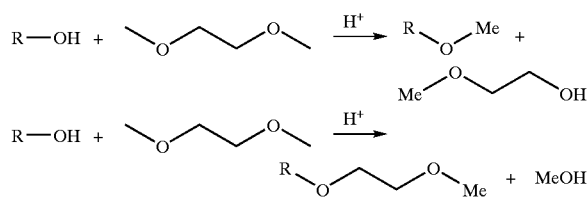

The reaction can be conducted at temperatures from 0° C. or below up to about 250° C., though the reaction is preferably conducted from about 20° C. to about 150° C., desirably 25 to 120° C. and especially 50 to 100° C. The pressure for the reaction is normally atmospheric pressure, though the reaction can be run under alternative pressures if desired. Pressure will be required if the reaction temperature is above the boiling point of the solvent.

The reaction can be accomplished by mixing the epoxy resin, solvent, and 0 to 100% of the water, and then adding the acid catalyst along with the remaining required water, if any. An alternative procedure is to combine some or all of the solvent, 0 to 100% of the water, and optionally a portion of the epoxy resin, and then add the acid catalyst and any remaining water. The remaining epoxy resin, diluted in any remaining solvent, is then gradually added to the reaction mixture over a period of time ranging from about 15 minutes to 24 hours, preferably from a half hour to 8 hours. Many other minor variations to these processes will also be apparent to one skilled in the art.

It is usually desirable to either neutralize the acid catalyst for the copolymerization and/or to remove it from the reaction medium. Neutralization can be accomplished by addition of a base, such as sodium, potassium, or lithium hydroxide or sodium or potassium carbonate. Other suitable bases are well known to one skilled in the art. Removal of the catalyst can be accomplished by neutralizing with a base that forms a salt that is insoluble in the reaction medium followed by filtration, or by treatment of the reaction mixture with an ion exchange resin that will remove the acid catalyst, such as a strong or weak base ion exchange resin.

If the molecular weight of the polymeric polyol is high enough, the gas-barrier coating can be prepared as a thermoplastic coating. However, the mechanical arid chemical resistance properties of the gas-barrier coating improve if the polymeric polyol coating is crosslinked with OH reactive crosslinking agents such as amino resins, multifunctional isocyanates and resoles. Particularly favored are the so-called amino resins which include melamine-formaldehyde resins, urea-formaldehyde resins, benzoguanamine-formaldehyde resins, glycouril-formaldehyde resins, as well as the etherified derivatives of these resins. A particularly preferred class of amino resin crosslinkers are the melamine-formaldehyde resins. They are described in Z. W. Wicks, F. N. Jones, and S. P. Pappas, Organic Coatings Science and Technology, 2nd Ed., Wiley-Interscience: New York, 1999, pp. 162-179.

When employing amino resin crosslinkers it is frequently necessary to include an acid catalyst in the coating formulation. Depending on the type of amino resin employed, this may be a strong acid catalyst such as a sulfonic acid, or a weaker acid such as a carboxylic acid. For example, fully alkylated melamine-formaldehyde resins such as hexamethoxymethyl melamine-formaldehyde resin (HMMM) usually require a strong acid catalyst, whereas high imino, partially alkylated resins respond well to weak acid catalysis.

Amino resins and polyols are not usually formulated on the basis of stoichiometry, but rather on a weight basis. In part this is due to the fact that many amino resin crosslinkers self condense at rates comparable to the transetherification reaction with polyols, and also due to the fact that many amino resins have a very high functionality and all of the reactive groups need not react in order to achieve useful properties. However, the exact properties that one obtains are a function of the ratio of amino resin to polyol, and the best formulation for a given application is normally found by running a number of experiments varying this ratio. The ratio of the weight of polymeric polyol solids to amino resin crosslinker solids that yields useful properties can vary from about 99:1 to 50:50, preferably from about 95:5 to 70:30 and most preferably 95:5 to 85:15.

The time and temperature of cure for an amino resin can vary considerably depending upon the nature of the formulation, the catalyst level, the blocking agent for the catalyst if one is present, and the exact properties desired. Acid catalyst levels can vary from about 0.05 wt % based on total resin solids to about 10 wt %. Cure temperature can vary from ambient temperature (about 20° C.) to about 250° C., and cure times can vary from several hours to just a few seconds. For example, combinations of high catalyst level, low cure temperature and long cure time might be employed for a plastic gas-permeable packaging substrate or layer that cannot tolerate high temperatures.

When using highly alkylated melamine resins, strong acid catalysts such as p-toluenesulfonic acid and the like are employed. To coat PET, a fairly low temperature cure (less than about 75° C.) must be employed, so as to avoid damage to the PET substrate. To effect such a cure, fairly high levels of catalysts must be employed. Higher levels of catalyst decrease the temperature and/or time required for adequate cure, but decrease the pot life of the coating. Useful levels range from about 0.1 wt % to 5 wt % based on total resin solids, preferably about 0.5 wt % to 3 wt %. Useful cure temperatures range from about 50° to about 75° C., preferably from about 60° C. to 70° C.

Gas-barrier layers or coatings prepared from the polymeric polyols and amino resin crosslinkers can be formulated with a wide variety of ingredients well known to those skilled in the art of gas-barrier coating formulation, including solvents, fillers, pigments, pigment dispersing agents, rheology modifiers, thixotropes, flow and leveling aids, defoamers, and the like.

Oxygen permeability rates can be decreased by incorporation of fillers. Useful fillers are described in U.S. Pat. No. 5,840,825, and are incorporated by reference. For use on containers for malt beverages, it is desirable to tint the coating so as to block at least 90% of light with wavelengths of electromagnetic radiation ranging from 300 nm to 500 nm. Useful tints to accomplish this are described in U.S. Pat. No. 5,728,439, and are incorporated by reference.

Gas-barrier coatings of this invention can be applied to the surface of the gas-permeable plastic packaging material by any number of techniques including spray, electrostatic spray, brush, roller, doctor blade, dip and others known in the art. They may also be applied using specialized industrial equipment such as that employed in coil coatings. The thickness of the coatings may range in amount from 1 to 100 microns, preferably 5 to 10 microns.

Numerous plastic gas-permeable substrates known in the art are suitable for application of barrier coatings of this invention with proper surface preparation, as is well understood in the art. Such plastic substrates include but are not limited to polyolefins, poly(ethylene terephthalate) (PET), poly(ethylene naphthalate) and polycarbonates. These substrates may have a thickness ranging from 2 to 100 mils, preferably 5 to 25 mils, and most desirably films of 15 to 20 mils.

EXAMPLE 1

Preparation of Copolymer of RDGE and Water. In a 500 ml 4-neck round bottom flask equipped with mechanical stirrer, thermocouple and reflux condenser was placed 59.80 g ERISYS RDGE/H resin (CVC Specialty Chemicals, liquid epoxy resin based on the diglycidyl ether of resorcinol, epoxy eq wt 115–120), 119.93 g 1,4-dioxane, and 14.95 g DI water. The temperature was 21° C. Through a constant pressure addition funnel, 5.00 g of 60% perchloric acid was added over the course of 5 minutes. Over the course of the next 30 minutes, the temperature rose to 79° C. Heat was then applied from a mantle to maintain the temperature at 65° C. A mixture of 90.20 g ERISYS RDGE/H epoxy resin and 30.07 g 1,4-dioxane was then gradually added over 3.0 hours. A sample was removed 2.25 hours after completion of the feed and titrated with perchloric acid in the presence of glacial acetic acid and tetraethylammonium bromide. No end point could be found, indicating that epoxide conversion was complete within the limits of detection of the method. The mixture was neutralized with 57.5 mL of IRA-67 ion exchange resin, diluted with 60 g 1,4-dioxane and filtered. The final product had Mw=3441 and Mn=1536 by GPC vs. polystyrene standards, a solids content of 52.1%, and a Brookfield cone and plate viscosity of 7815 cP at 25° C. (CP-52 spindle, 20 rpm).

EXAMPLE 2

Preparation of Copolymer of BFDGE and Water. In a 500 mL 4-neck round bottom flask equipped with mechanical stirrer, thermocouple and reflux condenser was placed 42.28 g Epalloy 8220 resin (CVC Specialty Chemicals, liquid epoxy resin based on the diglycidyl ether of bisphenol-F, epoxy eq wt 164–176), 123.07 g 1,4-dioxane, and 10.57 g DI water. The temperature was 21° C. Through a constant pressure addition funnel, 5.00 g of 60% perchloric acid was added over the course of 5 minutes. Over the course of the next 30 minutes, the temperature rose to 40° C. Heat was then applied from a mantle to raise the temperature to 90° C. A mixture of 107.72 g Epalloy 8220 resin and 26.93 g 1,4-dioxane was then gradually added over 3.5 hours. A sample was removed 20 minutes after completion of the feed and titrated with perchloric acid in the presence of glacial acetic acid and tetraethylammonium bromide. No end point could be found, indicating that epoxide conversion was complete within the limits of detection of the method. The mixture was held at 90° C. for an additional 40 min., neutralized with 37.5 mL of IRA-67 ion exchange resin, diluted with an additional 20 g of 1,4-dioxane and filtered. The final product had Mw=15,298 and Mn=2510 by GPC vs. polystyrene standards, a solids content of 54.6%, and a Brookfield cone and plate viscosity of 4118 cP at 25° C. (CP-52 spindle, 20 rpm).

EXAMPLE 3

Preparation of Copolymer of BADGE and Water. In a 2000 mL 4-neck round bottom flask equipped with mechanical stirrer, thermocouple and reflux condenser was placed 123.33 g Epon 828 resin (Resolution Performance Products, liquid epoxy resin based on the diglycidyl ether of bisphenol-A, epoxy eq wt 185–192), 374.44 g 1,4-dioxane, and 30.83 g DI water. The temperature was 26° C. Through a constant pressure addition funnel, 16.67 g of 60% perchloric acid was added over the course of 1 minute. Over the course of the next 30 minutes, the temperature rose to 38° C. Heat was then applied from a mantle to raise the temperature to 90° C. A mixture of 376.67 g Epon 828 resin and 125.56 g 1,4-dioxane was then gradually added over 3 hours. A sample was removed 3 hours after completion of the feed and titrated with perchloric acid in the presence of glacial acetic acid and tetraethylammonium bromide. No end point could be found, indicating that epoxide conversion was complete within the limits of detection of the method. The mixture was neutralized with 125 mL of IRA-67 ion exchange resin, treated with 50 mL of 4 angstrom molecular sieves and diluted with an additional 15 g of 1,4-dioxane. The final product had Mw=13,122 and Mn=2721 by GPC vs. polystyrene standards, a solids content of 56.9%, and a Brookfield cone and plate viscosity of 3656 cP at 25° C. (CP-52 spindle, 20 rpm).

Measurement of Oxygen Permeability Rates. In the following examples the gas permeability measurements were performed at ambient temperature (approximately 25° C.) in microprocessor-controlled monometric cells. The cells operated with a sweep of gas across the feed side of the cell and a vacuum on the permeate side of the cell. Circular test samples with a diameter of 11 cm were seated in the apparatus between O-ring seals. The pressure rise from vacuum (typically 0.1 Torr) to 3 Torr was measured as a function of time. Repetitive measurements over that pressure range were averaged to calculate the permeability coefficient for the particular gas. Measurements were made on a daily basis. The permeability was considered to be at equilibrium values when the average for two consecutive days' measurements were within 4%. Helium permeability was first measured until equilibrium was obtained, which typically was achieved within 48 hours, followed by oxygen. Following this procedure, the measurement was conducted at 0% relative humidity. Oxygen permeability constants for the coating samples were calculated from the results for the coated PET samples using the following equation as given in U.S. Pat. No. 5,637,365:

$$\frac{1}{R_1} = \frac{1}{R_2} + \frac{DFT}{P_{O2}}$$

where $R_1$=coated film transmission rate (Dow units)

$R_2$=PET film transmission rate

DFT=coating dry film thickness (mil)

$P_{O2}$=oxygen permeability constant of the coating (Dow units).

EXAMPLE 4

This example shows the preparation of a barrier coating on PET film based on the copolymer of Example 1. In a glass jar were combined 17.29 g of the copolymer of Example 1, 14.68 g Dowanol® PM solvent (Dow Chemical Co.), 1.02 g Resimene® 747 melamine-formaldehyde resin (Solutia Inc.) 0.02 g of SF-1023 silicone surfactant (General Electric Co.) and 0.60 g of a 10% solution of p-toluenesulfonic acid in 1-butanol. This formulation contains a 90/10 ratio of copolymer to melamine-formaldehyde ratio, and a total solids content of 30% by weight. The mixture was allowed to stand for 30 min, then applied to a 2 mil PET film using a 0.028 inch wire wound rod. The film was baked for 30 min. at 65° C. The final coating was smooth, colorless, and exhibited high optical transparency. The film thickness was 0.24 mils, and the oxygen permeability of the film was found to be 0.12 Dow units.

EXAMPLES 5–12

These examples show barrier coatings on PET films using the copolymers of Examples 1–3. Using the procedure of Example 4, barrier coatings were prepared on 2 mil PET film using the formulations described in Table 1. Cymel® UM-15 and Cymel® U-60 resins are urea-formaldehyde resins available from Cytec Industries, Inc. All of the final coatings were smooth, colorless, and exhibited high optical transparency.

TABLE 1

| Reagents (g) | Ex 5 | Ex 6 | Ex 7 | Ex 8 | Ex 9 | Ex 10 | Ex 11 | Ex 12 |
|---|---|---|---|---|---|---|---|---|
| Ex 1 Polymer | 15.37 | 18.25 | | | | | | |
| Ex 2 Polymer | | | | | 15.01 | 17.39 | | |
| Ex 3 Polymer | | | 14.06 | 16.69 | | | 16.69 | 16.69 |
| Dowanol ® PM | 15.58 | 14.23 | 16.89 | 15.78 | 16.60 | 15.08 | 15.78 | 15.72 |
| Resimene ® 747 | 2.04 | 0.51 | 2.04 | 0.51 | 2.04 | 0.51 | | |
| Cymel ® UM-15 | | | | | | | 0.51 | |
| Cymel ® U-60 | | | | | | | | 0.57 |
| SF-1023 | 0.02 | 0.02 | 0.02 | 0.02 | 0.02 | 0.02 | 0.02 | 0.02 |
| 10% p-TSA in BuOH | 0.60 | 0.60 | 0.60 | 0.60 | 0.60 | 0.60 | 0.60 | 0.60 |
| Wt % Solids | 30 | 30 | 30 | 30 | 30 | 30 | 30 | 30 |
| Copolymer/Crosslinker | 80:20 | 95:5 | 80:20 | 95:5 | 80:20 | 95:5 | 95:5 | 95:5 |
| Film Thickness (mil) | 0.31 | 0.26 | 0.35 | 0.29 | 0.36 | 0.34 | 0.32 | 0.32 |
| O2 Permeability Constant (Dow Units) | 0.36 | 0.14 | 2.87 | 2.44 | 4.69 | 1.53 | 1.52 | 1.69 |

Statement of Industrial Application

Polymeric polyols comprising copolymers of multifunctional epoxy resin and water, subsequently crosslinked with amino resins, significantly decrease oxygen and carbon dioxide permeability when applied as thin films to PET surfaces. These coatings are of utility in the packaging industry, where they serve to increase the shelf life of beverages packaged in PET containers.

We claim:

1. A method for making a multilayer packaging material which reduces transmission of oxygen comprising
    (a) providing a gas-permeable packaging material,
    (b) providing a gas-barrier coating comprising a polymeric polyol made by copolymerizing a multifunctional epoxide resin and water in the presence of an amount of acid effective for polymerizing the epoxide resin and the water, the amount of water being sufficient to avoid gelation, the polymeric polyol optionally reacted with a cross-linking agent for hydroxyl functionality, and
    (c) applying the gas barrier coating over the gas-permeable packaging material to form a multilayer packaging material.

2. The method of claim 1 in which the gas-barrier coating has an oxygen permeability constant (OPC) less than 2 Dow units.

3. The method of claim 1 in which the crosslinking agent is an amino resin.

4. The method of claim 1 in which the epoxide resin is the diglycidyl ether of bisphenol-A (BADGE), the diglycidyl ether of bisphenol-F (BFDGE), the diglycidyl ether of hydroquinone, or the diglycidyl ether of resorcinol (RDGE).

5. The method of claim 1 in which the epoxide resin is the diglycidyl ether of resorcinol (RDGE).

6. The method of claim 1 in which the acid is a superacid.

7. The method of claim 1 in which the acid is perchloric acid, trifluoromethanesulfonic acid, perfluoroalkylsulfonic acid, tetrafluoroboric acid, hexafluorophosphoric acid or boron trifluoride.

8. The method of claim 1 in which the gas-permeable material is a polyolefin, a poly(ethylene terephthalate), a poly(ethylene naphthalate) or a polycarbonate.

9. The method of claim 3 in which the amino resin crosslinking agent is a melamine-formaldehyde resin, a urea-formaldehyde resin, a benzoguanamine-formaldehyde resin, a glycouril-formaldehyde resin, or an etherified derivative thereof.

10. The method of claim 3 in which the amino resin crosslinking agent is a melamine-formaldehyde resin.

11. The method of claim 2 in which the epoxide resin is the diglycidyl ether of bisphenol-A (BADGE), the diglycidyl ether of bisphenol-F (BFDGE), the diglycidyl ether of hydroquinone, or the diglycidyl ether of resorcinol (RDGE), the gas-permeable material is a polyolefin, a poly(ethylene terephthalate), a poly(ethylene naphthalate) or a polycarbonate and the crosslinking agent is a melamine-formaldehyde resin, a urea-formaldehyde resin, a benzoguanamine-formaldehyde resin, a glycouril-formaldehyde resin, or an etherified derivative thereof.

12. A multilayer packaging material comprising
   (a) at least one layer of a gas-permeable polymeric material, and
   (b) at least one layer of a gas-barrier coating comprising a polymeric polyol made by copolymerizing a multifunctional epoxide resin and water in the presence of an amount of acid effective for polymerizing the epoxide resin and the water, the amount of water being sufficient to avoid gelation, the polymeric polyol optionally reacted with an amino resin crosslinking agent.

13. The multilayer packaging material of claim 12 in which the gas-barrier coating has an oxygen permeability constant (OPC) less than 2 Dow units.

14. The multilayer packaging material of claim 13 in which the epoxide resin is the diglycidyl ether of bisphenol-A (BADGE), the diglycidyl ether of bisphenol-F (BFDGE), the diglycidyl ether of hydroquinone, or the diglycidyl ether of resorcinol (RDGE).

15. The multilayer packaging material of claim 13 in which the epoxide resin is the diglycidyl ether of resorcinol (RDGE).

16. The multilayer packaging material of claim 14 in which the acid is a superacid.

17. The multilayer packaging material of claim 16 in which the acid is perchloric acid, trifluoromethanesulfonic acid, perfluoroalkylsulfonic acid, tetrafluoroboric acid, hexafluorophosphoric acid or boron trifluoride.

18. The multilayer packaging material of claim 17 in which the gas-permeable material is a polyolefin, a poly(ethylene terephthalate), a poly(ethylene naphthalate) or a polycarbonate.

19. The multilayer packaging material of claim 18 in which the amino resin crosslinking agent is a melamine-formaldehyde resin, a urea-formaldehyde resin, a benzoguanamine-formaldehyde resin, a glycouril-formaldehyde resin, or an etherified derivative thereof.

20. The multilayer packaging material of claim 18 in which the amino resin crosslinking agent is a melamine-formaldehyde resin.

21. The multilayer packaging material of claim 16 in which the epoxide resin is the diglycidyl ether of resorcinol (RDGE), the gas-permeable material is a polyolefin, a poly(ethylene terephthalate), a poly(ethylene naphthalate) or a polycarbonate and the amino resin crosslinking agent is a melamine-formaldehyde resin.

22. A multilayer packaging material having at least one gas-permeable packaging material layer and at least one gas barrier material layer characterized in that the gas barrier material layer has an oxygen permeability constant (OPC) less than 2 Dow units and comprises the reaction product of
   (a) a polymeric polyol made by copolymerizing the diglycidyl ether of bisphenol-A, the diglycidyl ether of bisphenol-F, the diglycidyl ether of hydroquinone, the diglycidyl ether of resorcinol or a mixture thereof and water in the presence of an ether solvent and an amount of superacid effective for polymerizing the diglycidyl ether and the water, the amount of water being sufficient to avoid gelation and
   (b) an amino resin crosslinking agent which is a melamine-formaldehyde resin, a urea-formaldehyde resin, a benzoguanamine-formaldehyde resin, a glycouril-formaldehyde resin, or an etherified derivative thereof.

23. The multilayer packaging material of claim 22 in which the epoxide resin is the diglycidyl ether of resorcinol (RDGE).

24. The multilayer packaging material of claim 22 in which the superacid is perchloric acid, trifluoromethanesulfonic acid, perfluoroalkylsulfonic acid, tetrafluoroboric acid, hexafluorophosphoric acid or boron trifluoride.

25. The multilayer packaging material of claim 24 in which the gas-permeable material is a polyolefin, a poly(ethylene terephthalate), a poly(ethylene naphthalate) or a polycarbonate.

26. The multilayer packaging material of claim 24 in which the oxygen permeability constant (OPC) is less than 1 Dow units.

27. The multilayer packaging material of claim 26 in which the amino resin crosslinking agent is a melamine-formaldehyde resin.

28. A multilayer packaging material having at least one gas-permeable packaging material layer and at least one gas barrier material layer characterized in that the gas barrier material layer comprises the reaction product of
   (a) a polymeric polyol comprising glycol end groups and a repeat unit structure which contains two glycidyl units and primary and/or secondary alcohols and having a Mn of at least about 450 and
   (b) an amino resin crosslinking agent which is a melamine-formaldehyde resin, a urea-formaldehyde resin, a benzoguanamine-formaldehyde resin, a glycouril-formaldehyde resin, or an etherified derivative thereof.

29. The multilayer packaging material of claim 28 in which polymeric polyol comprises the following structure

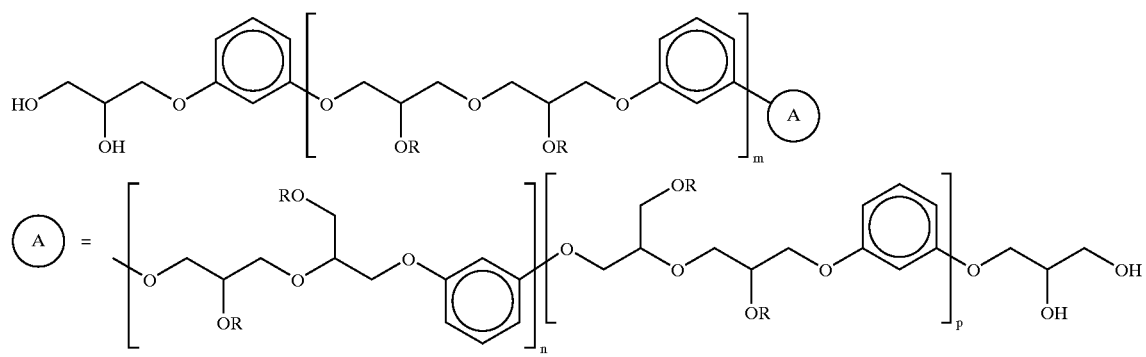
where R=hydrogen or either of the following radicals 1 or 2:
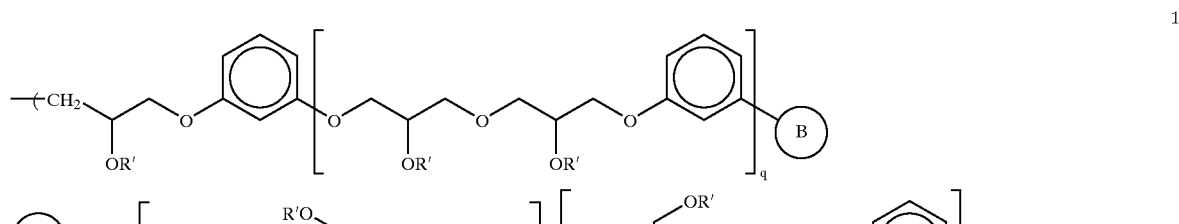
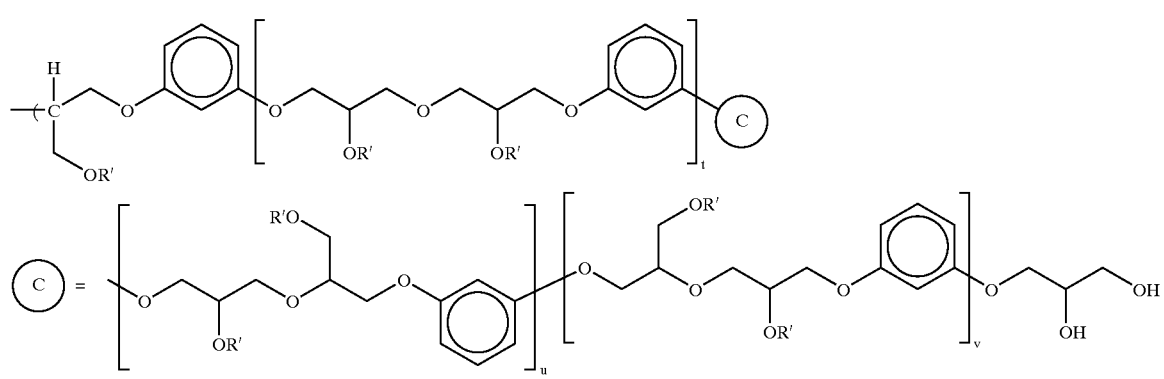
where R'=R or H and where m, n, p, q, r, s, t, u and v range from 0 up to about 50, with the proviso that (m+n+p)≧1; the m, n and p, the q, r and s and the t, u and v units appearing in random order.
30. The multilayer packaging material of claim 29 in which polymeric polyol has the structure
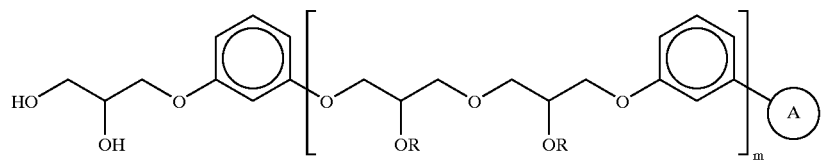

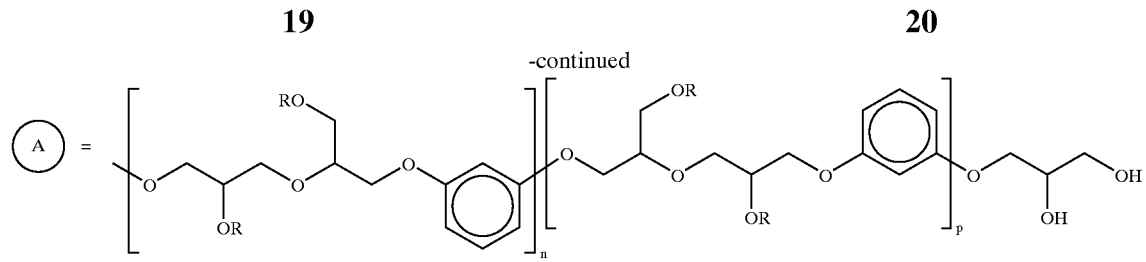

where R is H, and m, n and p range from 0 up to about 50, with the proviso that $(m+n+p) \geq 1$; the m, n and p units appearing in random order.

31. The multilayer packaging material of claim 29 in which polymeric polyol has the structure

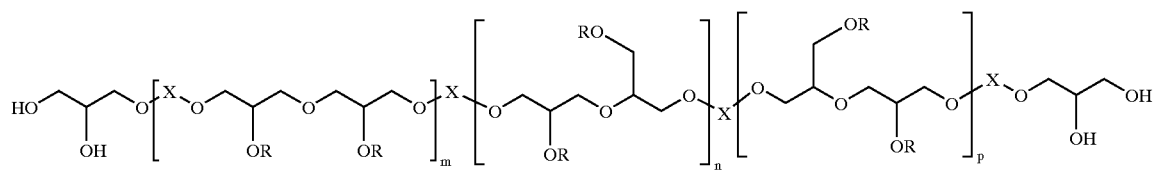

where X is an organic linking group from a diglycidyl ether, R is hydrogen or either of the following radicals 1 or 2:

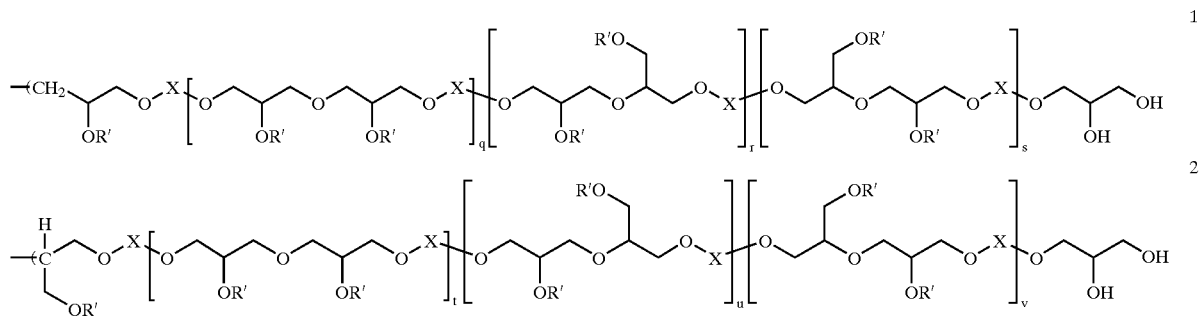

where R'=R or H and where m, n, p, q, r, s, t, u and v range from 0 up to about 50, with the proviso that $(m+n+p) \geq 1$; the m, n and p, the q, r and s and the t, u and v units appearing in random order.

32. The multilayer packaging material of claim 31 in which X is selected from the group consisting of

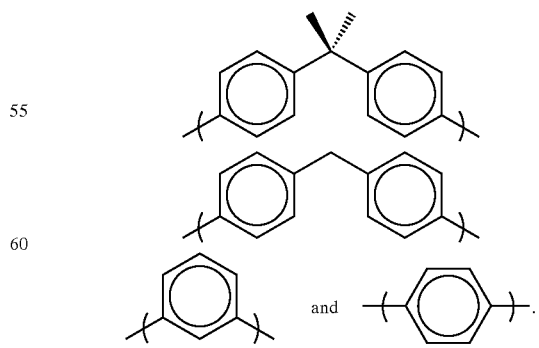

* * * * *